(No Model.)
J. E. AHLVIN & C. G. TENGDIN.
MACHINE FOR MAKING MOLDINGS.
No. 514,053. Patented Feb. 6, 1894.
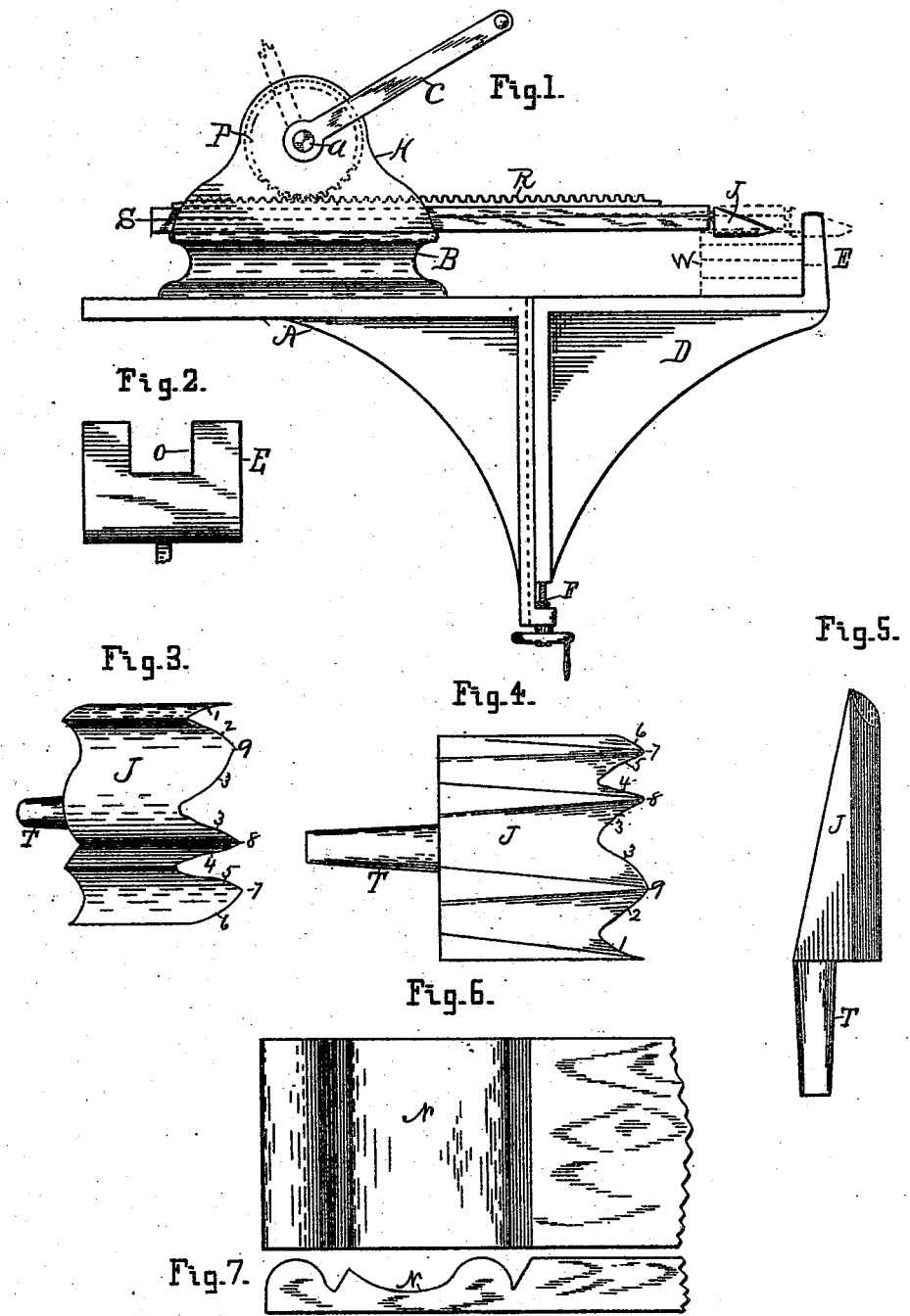
Witnesses:
Ray Hutchins.
Herbert Cowell
Inventors:
John E. Ahlvin
Charles Gottfrid Tengdin By
Thos. H. Hutchins their atty

UNITED STATES PATENT OFFICE.

JOHN E. AHLVIN AND CHARLES GOTTFRID TENGDIN, OF JOLIET, ILLINOIS.

MACHINE FOR MAKING MOLDINGS.

SPECIFICATION forming part of Letters Patent No. 514,053, dated February 6, 1894.

Application filed January 12, 1893. Serial No. 458,126. (No model.)

*To all whom it may concern:*

Be it known that we, JOHN E. AHLVIN and CHARLES GOTTFRID TENGDIN, citizens of the United States of America, residing at Joliet, in the county of Will and State of Illinois, have invented certain new and useful Improvements in Machines for Making Molding, of which the following is a specification, reference being had therein to the accompanying drawings and the letters and figures of reference thereon, forming a part of this specification, in which—

Figure 1, is a side view of the mold cutting knife mounted on a slide, and adapted to be reciprocated across and in a line parallel to the surface of the material to be cut. Fig. 2 is an end view of a portion of the machine showing an opening for the knife to pass through. Fig. 3, is a bottom view of the knife, showing its bottom formed to the shape of the molding to be cut, and showing oblique cutting edges formed by cutting the point of the tool obliquely from the sole upward toward the point. Fig. 4 is a knife of the plane showing its cutting edges, the V shaped dividing points thereof projecting forward of and above the remaining parts of the cutting edges. Fig. 5 is a side view of the knife detached from a machine to operate it and Figs. 6 and 7 are views of molding cut by the knife, being the product of the device.

This invention relates to certain improvements in a machine for cutting moldings across the grain of the wood, and designed more especially for cutting the cross moldings on corner blocks for use in what is commonly known as Eastlake finish or casings for doors and windows, which improvements are fully set forth and explained in the following specification and claims. Heretofore it has been the custom to saw such moldings by means of a band saw, which leaves the molding rough so that it is necessary to finish it up with files and sand paper, and when so sawed, it is impossible to make the molding uniform on each block. By the use of this plane the molding is cut by one movement or reciprocation of the knife, and is left perfectly smooth, so that it is ready for use without any further finish.

Referring to the drawings J represents the knife for cutting the molding, which is the only invention in this case, the machine for operating it only being shown to illustrate one means for operating the knife. The plane J is shown as attached by means of its rearwardly extending tang T to the forward end of a slide S supported in guideways in the stand B secured on a table top A, and having a rack R for meshing with a pinion P journaled in boxes H on stand B, and having a crank C secured to its shaft $a$ by means of which mechanism the knife J may be reciprocated across and in a line parallel to the surface of the material to be cut.

D is a vertically adjustable holder for holding the work or blocks W to be molded, the said holder being provided with the ledge E against which the block or work W rests while being cut, said ledge having an opening O for the knife J to pass through so that it can finish its stroke. The knife J has its under side or sole formed to the shape of the molding desired to be cut, as shown particularly in Fig. 3. Its forward end is cut off obliquely from the sole upwardly toward the point so as to form the forwardly projecting V shaped cutting or dividing points 7, 8, 9, and the cutting edges between and at the sides of said points as at 1, 2, 3, 4, 5, 6, which cutting edges conform to the shape of the molding. As the dividing points 7, 8, 9, are above the molding to be cut, and project in advance of the cutting edges 1, 2, 3, 4, 5, 6, the said points are prevented from tearing up the wood and breaking up the members of the mold, as would be the case if the knives and points were formed by cutting of the point of the tool in an oblique direction from the bottom or sole rearwardly. The upper part of the knife is ground away from its heel between the points 7, 8, 9 as shown in Fig. 4 so as to remove the metal down to meet the said diagonal cut on the under side so as to cause the said cutting edges to conform to the form of the mold on the under side of the knife. The cutting edges are always to be sharpened from the upper side so as to cause them to retain their form. The molded sole of the tool may be any form so as to adapt the tool for cutting any form of molding, and the tool may be operated by any device desired.

Figs. 6 and 7 show the product of the tool, it being a mold cut across the grain of a block of wood, such as is commonly used in door and window casings as a corner or base block.

Having thus described our invention, what we claim as new, and desire to secure by Letters Patent, is as follows, to wit:

1. In a machine for cutting molding, a knife mounted on a slide arranged and adapted to be reciprocated across and in a plane parallel to the surface of the material to be cut, said knife having its lower side or sole molded and cut from its lower molded side obliquely toward its forward end, and having its upper side cut away to form with said oblique cut, the projecting dividing points 7, 8, 9, and the rearwardly extending cutting edges 1, 2, 3, 4, 5, 6 substantially as and for the purpose set forth.

2. In a machine for cutting moldings a knife mounted on a slide arranged and adapted to be reciprocated across and in a plane parallel to the surface of the material to be cut, said knife having its lower side or sole molded, and having its molded sole cut obliquely to form forwardly projecting dividing points, and rearwardly and downwardly projecting diagonal cutting edges at the sides of said points and conforming to the shape of said mold substantially as and for the purpose set forth.

JOHN E. AHLVIN.
CHARLES GOTTFRID TENGDIN.

Witnesses:
THOS. H. HUTCHINS,
RAY HUTCHINS.